May 12, 1970   J. H. BARRY, JR., ET AL   3,511,191

PALLETS

Filed June 28, 1968   2 Sheets-Sheet 1

INVENTORS
JAMES H. BARRY, JR.
JOSEPH M. DI VERDI
JOHN P. TEMPLE
ALBERT C. PETITTO
BY John F. Steven
ATTORNEY.

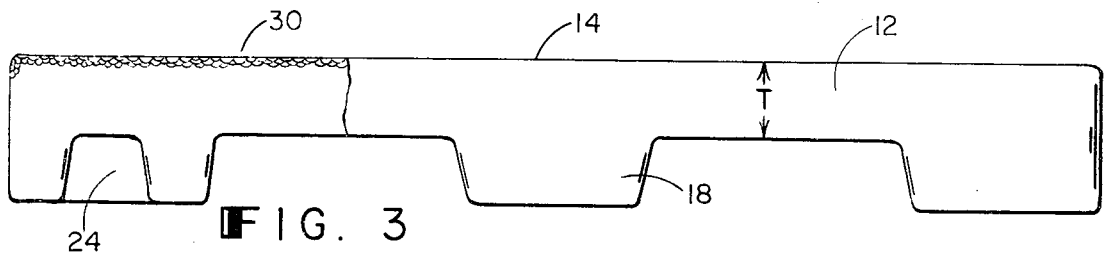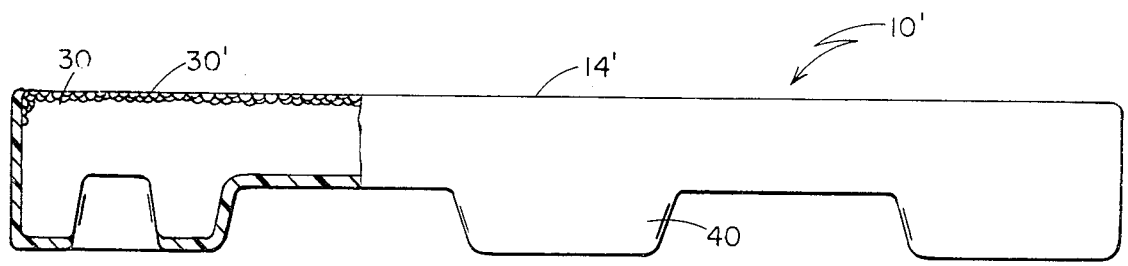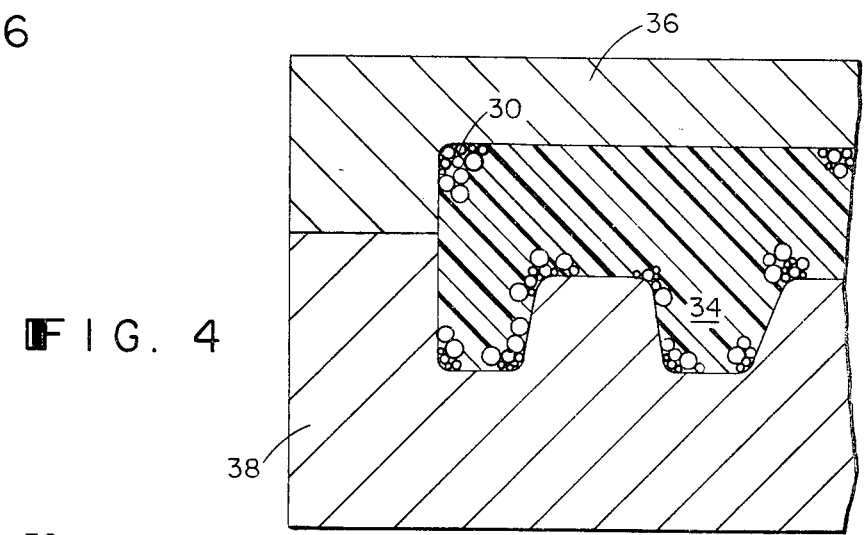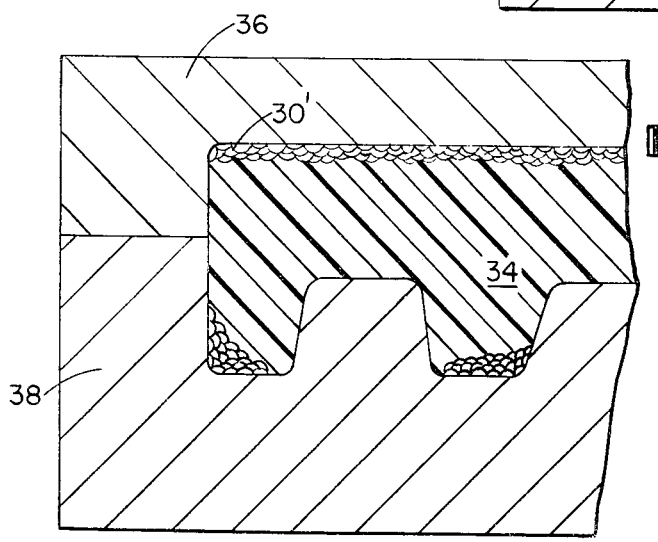

United States Patent Office 3,511,191
Patented May 12, 1970

---

3,511,191
PALLETS
James H. Barry, Jr., Lunenburg, Joseph M. Di Verdi, West Boylston, John P. Temple, Leominster, and Albert C. Petitto, Hudson, Mass., assignors to Foster Grant Co., Inc., Leominster, Mass., a corporation of Massachusetts
Filed June 28, 1968, Ser. No. 740,940
Int. Cl. B65d 19/18
U.S. Cl. 108—58                   4 Claims

ABSTRACT OF THE DISCLOSURE

A pallet for providing support for a load of material is provided which is constructed of molded thermoplastic foam particles, such as polystyrene. The pallet is constructed in a particular manner by the use of partially expanded particles which, during molding, further expand to fill void space between the particles and fuse the surface together.

---

Figure 1:
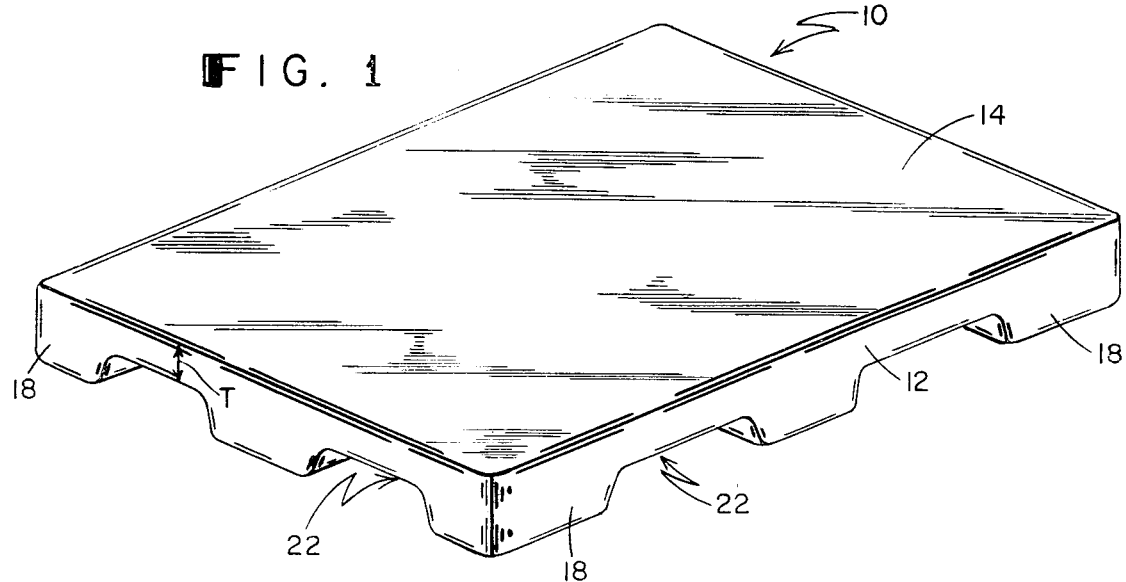

This invention relates generally to load supporting structures, and more specifically, this invention relates to structures such as pallets made of molded thermoplastic foam particles for use in transporting or storing material supported on the pallets.

The pallets according to this invention have the physical form of a rectangular platform having a predetermined thickness, with integral dependent members or legs extending from the bottom thereof for supporting the platform portion a predetermined distance above a generally horizontal surface such as a floor. The legs are strategically positioned throughout the underside of the platform for substantially uniformly supporting the platform and a load carried thereon. Desirably, legs are positioned at least at, or close to, the corners and at or near the central portion of the platform. The pallets according to this invention are also molded from a muliplicity of thermoplastic foam particles, which are capable of additional expansion and fusion to each other when molded. One desirable material for use in making the pallets is expanded polystyrene particles which have residual expanding agent remaining therein.

Pallets of various shapes and materials have been developed in the past. Materials such as combinations of metal and paper, fibrous material, plastic sheet material, other reinforced plastic material, various laminated material, and molded wood pulp. By far, however, the most widely used transporting and storage pallets used today are of wooden board construction. Apparently, pallets made of other materials have not been widely accepted, at least in the majority of instances, to replace the wooden board construction.

Wooden pallets are becoming increasingly expensive because of our diminishing supply of suitable wood, and perhaps more importantly, of the cost of labor in making these pallets. Furthermore, wooden pallets are excessively heavy, are of non-uniform quality, inherently have splinters which often damage articles carried thereon or rupture bags containing loose or powderous materials. Wooden pallets also are sometimes made from green lumber, and after drying out, the nails sometimes loosen enough to drop out or protrude.

It is, therefore, a primary object of this invention to provide a pallet of thermoplastic foam material which overcomes such disadvantages as those constructed of wooden boards. Pallets constructed of thermoplastic foam particles are lighter in weight, are of uniform quality, free from warpage, and do not splinter. Furthermore, such thermoplastic foam pallets are clean and easy to handle.

It is another object of the present invention to provide a pallet that is simple in construction, and economical to manufacture.

It is a further object of this invention to provide a pallet for use in transporting and storing materials which is not adversely affected by high relative humidity conditions.

It is still a further object of this invention to provide a pallet which is economical enough to dispose of after one or several uses if desired.

Various other objects and advantages will appear from the description which follows of one embodiment of the invention, and the novel features will be particularly pointed out hereinafter in connection with the appended claims.

Figure 2:
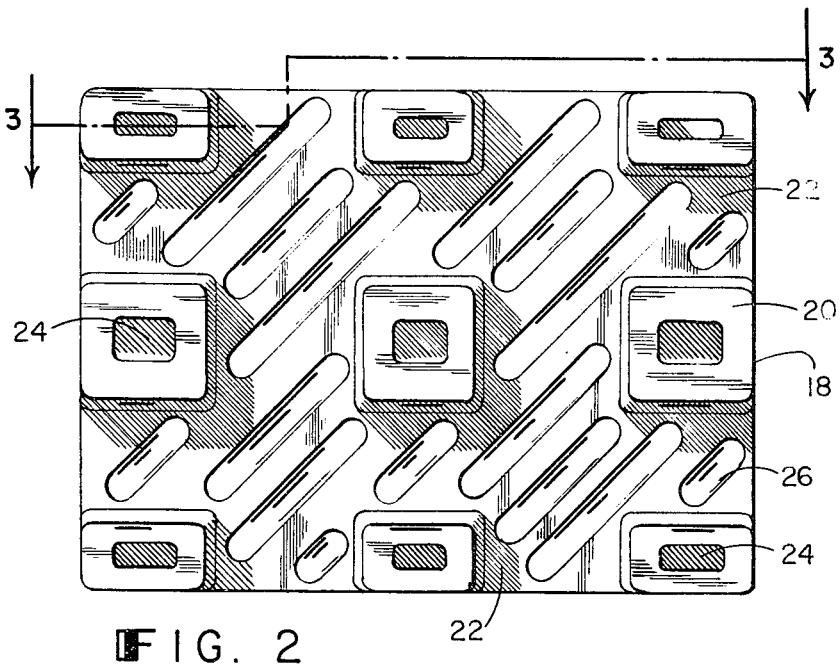

In the drawings:
FIG. 1 is a perspective view of a pallet manufactured in accordance with our invention.
FIG. 2 is a bottom plan view of such a pallet.
FIG. 3 is a cross-sectional view taken substantially along line 3—3 of FIG. 2.
FIG. 4 is a partial cross-sectional view of a mold cavity filled with partially expanded thermoplastic foam particles.
FIG. 5 is a view similar to FIG. 4 showing the mold cavity filled with expanded, fused particles.
FIG. 6 is a cross-sectional view similar to FIG. 3, showing another embodiment of our invention.

Referring to the drawings, a pallet in accordance with our invention is illustrated in the drawings and is designated generally at 10. The pallet 10 comprises a generally rectangular platform portion 12 having a substantially flat top surface 14. Platform section 12 is of a thickness T. Pallet 10 is provided with a plurality of dependent members or legs 18, which are integral with the platform portion 14 and extend in a downward direction therefrom. The pallet 10 is of a molded construction, its material comprising a multiplicity of thermoplastic foam particles. The entire surface of the platform portion 14 and the legs 18 is smooth, so that in use, there will be a minimum of flaking or chipping away of the particles which make up the pallet.

Legs 18 are strategically positioned at predetermined locations about the bottom of the platform to provide support for the platform and a load carried thereon. Preferably, legs 18 are positioned at least at or near the bottom corners of platform portion 12, and additionally, it is preferred that legs 18 be positioned at the mid-sections of the sides and in the center, as illustrated in the drawings. This arrangement has been found to provide adequate support in most instances.

Legs 18 are preferably tapered inwardly from their juncture with the platform section 12 to their bottom. As mentioned previously, the legs 18 and platform section 12 are integral. The bottoms 20 of the legs are generally flat and lie in a plane generally parallel with the top surface 14 of platform portion 12, so that when the pallet 10 rests on a flat surface, each of the legs 18 contribute equally towards maintaining top surface 14 of platform portion 12 in a level position.

The length of legs 18 is preferably short; thus providing a minimum of bending and possible fracture when subjected to shear forces. The legs 18, however, are sufficiently long to provide appreciable space between the plane in which the bottom of the legs lie and the bottom surface of the platform 12, to allow handling equipment, such as a fork lift to be inserted in the spaces 22 between the legs when the pallet 10 is resting on a surface. Also, the legs 18 desirably are spaced sufficiently apart to allow sufficient distance between adjacent legs 18 for such handling equipment to enter these spaces 22.

Legs 18 are also desirably provided with openings 24 to aid in the molding thereof. Such openings 24 have not been found to detract appreciably from the strength of the legs, and prevent the presence of undesirable, abnormally thick portions which increase molding time because of additional material which heat would have to penetrate during molding; also, which would require a greater amount of cooling time. It is furthermore desirable for the openings 24 to be tapered oppositely to the taper of the legs to provide ease of ejecting the molded pallet 10 from a mold. The openings 24 desirably extend for the length of the legs, that is, to the bottom of the platform portion 12.

The bottom surface of platform portion 12 is preferably provided with a network of cavities 26 which result in this bottom surface having a ribbed structure for providing maximum strength for a given size or amount of material used. The ribs 28 are substantially continuous throughout the bottom surface. The pallet 10 may also be reinforced with strengthening materials such as, for example, wire mesh.

Referring now to FIGS. 3, 4 and 5 in particular, the pallet 10 is shown in partial cross-section illustrating the manner in which the thermoplatsitc foam particles are arranged therein to make the unitary pallet construction. Partially expanded or foamed particles 30 are used in the molding of the pallet 10. Since a mass of particles 30 would inherently have void space between individual particles, the particles prior to molding must contain residual expanding agent to fill these voids, so as to tightly compress and fuse the surfaces of the particles together around substantially the entire surface of the particles. FIG. 4 illustrates in section a mold cavity 34 formed by mold halves 36 and 38 filled with the partially expanded particles 30. Upon activation of the expanding agent by heat, the particles further expand to tightly compress the surfaces thereof fuse together to form a unitary solid body in the form of pallet 10, as shown in FIG. 5. It will be observed that the outer surface of the particles 30' adjacent the mold halves 36 and 38 becomes flat during the final expansion of the particles to form a substantially smooth surface over the entire pallet. The molded pallet preferably has a density of less than ten pounds per cubic foot, preferably between 0.5 and 6 pounds per cubic foot.

FIG. 6 illustrates another embodiment of the present invention in which a portion of the surface area of the pallet 10' is covered by a protective film or sheet 40 of a tough material such as, for example, high impact polystyrene. This film or sheet 40 may be molded to conform to the contour of the pallet 10' and subsequently laminated therewith and permanently secured by a suitable adhesive. Alternately, the film or sheet 40 may be formed over the contour of the pallet while the former is hot, in a thermoplastic condition, and heat sealed to the surface of pallet 10. In instances where the additional expenditure of laminating such a film or sheet 40 to the pallet 10' can be justified, substantial improvement in strength and durability are realized. As illustrated in FIG. 6, the film or sheet 40 covers substantially the entire surface area of the pallet 10', except for the top surface 14'. However, if desired, a lesser or greater area could be covered.

An example of typical molding procedure for a pallet in accordance with our invention is as follows:

Particles of aproximately 5 pounds per cubic foot are loaded into a closed mold. The mold is completely filled with the particles and the loading part is closed. The mold contains a number of openings through which steam is injected from both sides for a period of between 5-50 seconds. Provision is made for draining condensed steam from the mold. Steam is allowed to completely penetrate the cavity of the mold to heat, and thereby expand and fuse the particles together. Subsequent to the application of steam, the molded pallet is cooled by the action of cooling water passed through the mold blocks for a period of 2-30 minutes. The mold halves are then opened and the molded pallet is ejected from the cavity. The mold is now ready for recycling.

It will be understood that various changes in the details, materials, steps and arrangements of parts, which have been herein described and illustrated in order to explain the nature of the invention, may be made by those skilled in the art.

We claim:

1. An article for supporting material loaded thereon comprising:
   a pallet formed from a multiplicity of polystyrene foam particles having a density of between 0.5 pound per cubic foot and 6 pounds per cubic foot, said pallet having a platform and a plurality of dependent members at least adjacent the corners thereof for supporting said platform;
   said platform having a generally flat top surface and being of sufficient thickness to provide adequate strength to support a predetermined load;
   said thermoplastic foam particles being tightly compressed and uniformly fused together, and presenting a substantially smooth surface so as to prevent flaking away of outer particles;
   said dependent members being integral with said platform, spaced apart to permit prongs of a fork lift to be placed under said platform between said members, and placed at load supporting points below said platform so that together they substantially uniformly support said platform and a load carried thereon.

2. An article according to claim 1 in which at least a part of the surface is provided with a toughened skin by means of sheet material laminated thereto.

3. An article according to claim 1 in which at least portions of the surface are provided with strengthening strips laminated thereto.

4. An article according to claim 1 wherein said dependent members have openings therein extending for substantially their entire length allowing quicker cooling in the area of said dependent members during the molding of said pallets.

References Cited
UNITED STATES PATENTS

| | | | |
|---|---|---|---|
| 2,991,965 | 7/1961 | Drieborg | 108—58 |
| 3,043,627 | 7/1962 | Torjhsen | 297—456 |
| 3,140,672 | 7/1964 | De Luca | 108—58 |
| 3,187,689 | 6/1965 | Hess | 108—58 |
| 3,187,691 | 6/1965 | Leitzel | 108—58 |
| 3,228,359 | 1/1966 | Sepe et al. | 108—58 |
| 3,359,929 | 12/1967 | Carlson | 108—58 |
| 3,404,642 | 10/1968 | Belcher et al. | 108—58 |
| 3,405,666 | 10/1968 | Miller | 108—58 |

BOBBY R. GAY, Primary Examiner

G. O. FINCH, Assistant Examiner

U.S. Cl. X.R.

108—51